Jan. 24, 1961      D. B. MacCOLLOM      2,969,287
METHOD OF MAKING FROZEN DESSERT MIX
Filed Feb. 24, 1958
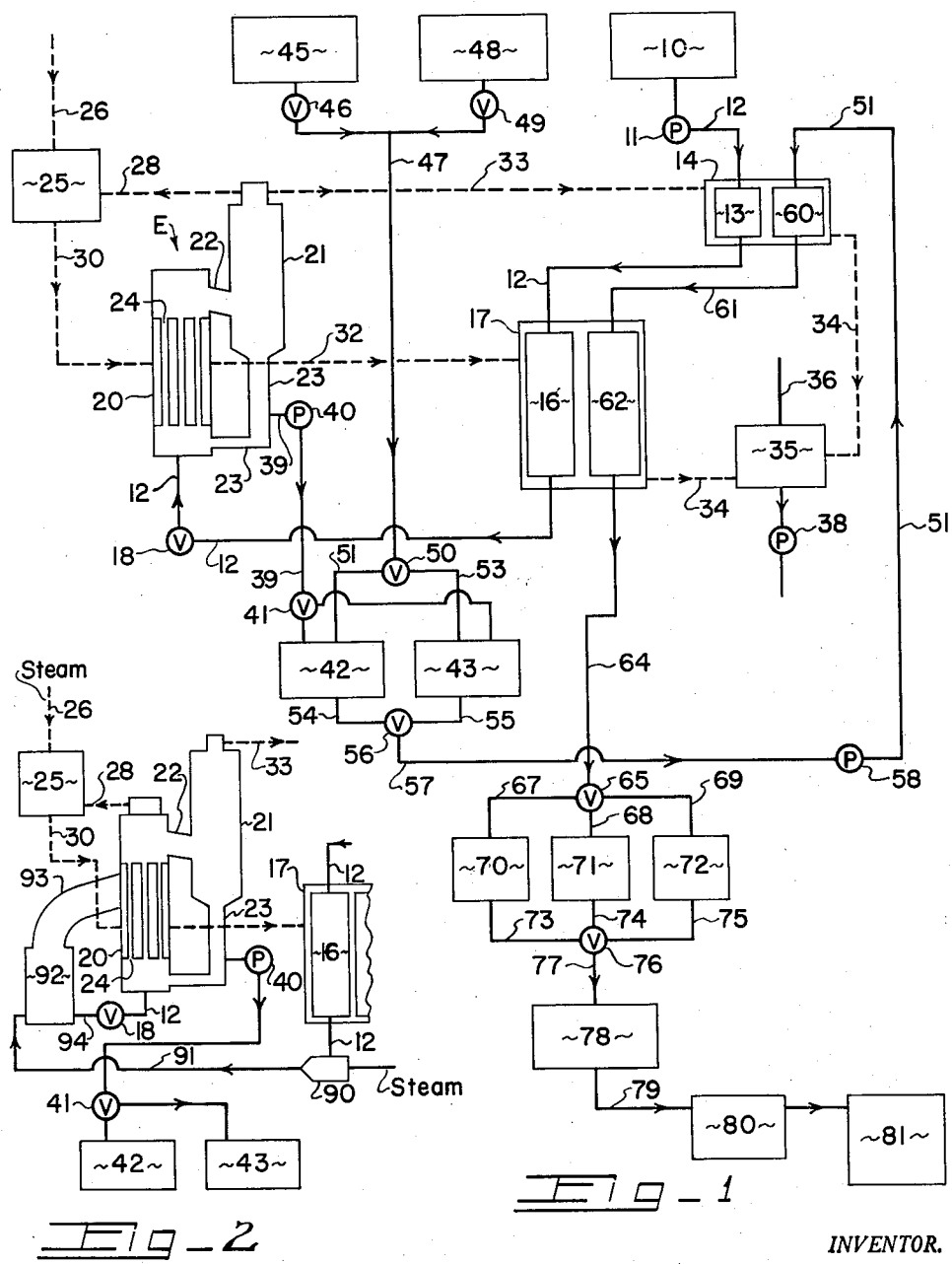
INVENTOR.
Donald B. MacCollom
BY D. Emmett Thompson
ATTORNEY

United States Patent Office 2,969,287
Patented Jan. 24, 1961

2,969,287

METHOD OF MAKING FROZEN DESSERT MIX

Donald B. MacCollom, 168 Winston Way, Dewitt, N.Y.

Filed Feb. 24, 1958, Ser. No. 717,106

2 Claims. (Cl. 99—55)

This invention relates to a process for the manufacture of finished liquid mixes, such as are used in preparing frozen desserts, as ice-cream and the like.

At the present time liquid mixes of this sort are made by one of two processes. In the first process, which is in general and extensive use, the milk is concentrated in a plant, other than the frozen dessert plant, by the removal of some or all of the water, and subsequent cooling. The concentrated milk is then shipped to the frozen dessert plant where some water is added back along with the other ingredients, such as sugar, stabilizer, butter fat, which may be necessary to the production of the frozen dessert. The auxiliary plant where the milk is concentrated, is a fully staffed organization and has a power plant to provide the necessary steam and refrigeration. The frozen dessert plant is also a fully staffed organization with a power plant to provide steam for re-heating the milk, and other ingredients, and subsequently cooling it after pasteurization.

The second method, in limited use, for the manufacture of the finished mix consists in first mixing raw milk, butter fat, sugar, and other ingredients, and then heating up the mixture so as to concentrate the milk during, or along with, the pasteurizing of the mixture. Subsequently, this mixture is homogenized and cooled in the normal manner to form the finished mix.

This second process has serious disadvantages. It is highly inflexible—that is, only one mix could be run through the machine in any one run. For example, if the mix consisted of 10% by weight of butter fat content, in order to increase, or decrease, this amount, the machine had to be shut down and cleaned out before the aforementioned ingredients could be put into the machine in the proper proportions to give the resultant new mix. Since the average ice-cream plant is called upon to make as many as six different mixes in one day, this second process is consequently highly inefficient because of the lost time involved in shut-downs and cleaning operations. In addition, since the sugar and butter fat were added to the milk, and the whole mix was then heated in order to concentrate and pasteurize the mix, the resultant mix often had what was known in the art as a "cooked" flavor. This was due to the fact that the sugar tended to "caramelize" due to the high temperatures at which it is subjected for the periods of time required to concentrate the milk and pasteurize the mix. This is particularly so when a portion of the mix remains in the evaporator for an excessive length of time.

Accordingly, it is the purpose of this invention to provide a new and improved process for the manufacture of liquid mixes for use in frozen desserts that;

(1) Eliminates the cost of supporting an auxiliary plant for concentrating milk without creating its counterpart within the frozen dessert plant.

(2) Integrates the concentrating function into the mix-making operation in a continuous and flexible manner, without damage to flavor.

(3) Provides for maximum economy of steam, water, labor and refrigeration in the integrated operation.

In the drawings—

Figure 1 is a schematic diagram or flow sheet showing an arrangement of apparatus suitable for carrying out my process.

Figure 2 illustrates a rearrangement of the apparatus shown in Figure 1 for providing ultra high heat treatment of the raw milk.

In carrying out my process, the concentration of the raw milk, the formation of the mix and the pasteurizing thereof, is carried out by an integrated arrangement requiring the services of only one operator. In my process, I use the vapor of evaporation from the milk condensing unit for preheating the raw milk and for preheating the mix. I supply the evaporator with excess steam vapor over that necessary to operate the evaporator per se, this steam vapor consisting of approximately 40% of vapor evaporation. The excess steam vapor is employed to raise the temperature of the preheated raw milk above the flash temperature in the evaporator, and also to bring the preheated mix to pasteurizing temperature. The steam vapor is furnished to the evaporator by a thermo-compressor which functions to pick up one pound of vapor or evaporation for each 1.4 pounds of live steam supplied to the thermo-compressor. This arrangement effects a very substantial saving in the consumption of both fuel and water in the manufacture of the mix.

The drawing illustrates a schematic arrangement suitable for carrying out my process. The raw milk is taken from a holding tank 10 by a pump 11, line 12, through the raw milk compartment 13 of a preheater 14, thence through compartment 16 of a final heater 17, through a control valve 18, to an evaporator designated generally E. This evaporator is of the single-effect recompression type and includes a steam chest 20, a vapor separator 21 interconnected with the steam chest by a nozzle 22 and at its lower end the separator is connected to the steam chest by a return pipe 23 to provide for the circulation of the milk while being concentrated by boiling in the vacuum maintained in the evaporator E.

The raw milk moves upwardly through a series of vertically disposed tubes 24 arranged in the steam chest 20 and surrounded by steam vapor. Live steam is furnished to a thermo-compressor 25 from steam line 26. A portion of the vapor of evaporation is taken from the upper end of the separator 21 by line 28 to the thermo-compressor 25 where the vapor is entrained by the action of the high pressure steam entering from line 26 in the well known manner of steam injectors. This vapor of evaporation which enters the thermo-compressor 25 is recompressed and enters the steam chest 20 through the line 30. This recompressed steam vapor consists approximately of forty percent of vapor of evaporation, accordingly effecting a substantial reduction in the consumption of live steam by the operation of the evaporator E. The showing of the evaporator is illustrative of a type of recompression evaporator in general use but other specific types may be used in carrying out my process. Also, in the schematic showing, I have omitted certain conventional connections and fittings, such as venting, liquid level control, etc., which are well understood in this art.

The thermo-compressor 25 is designed and constructed, and the arrangement is operated in such manner that the mixture of the live stream and the vapor of evaporation provides steam vapor to the steam chest 20 in excess of that needed for the evaporation of the evaporator. The excess steam vapor is conducted from the steam chest by line 32, to the final heater 17 to raise the temperature of the raw milk passing through the compartment 16 to within 10° of the temperature of the compressed steam vapor.

Part of the vapor of evaporation is drawn off from the top of the vapor separator through line 33 to the preheater 14. The preheater 14 and the final heater 17 are connected by lines 34 to a condenser 35 supplied with cold water from line 36 and operated by a suction pump 38. It will be apparent that by varying the flow of water to the condenser, the vacuum within the evaporator E may be varied, thus determining the concentration of the milk.

The concentrated milk is withdrawn from the lower portion of the evaporator through a line 39 by action of a pump 40, the concentrated milk being conveyed by operation of valve 41 to either tank 42 or 43.

The sugar syrup is conveyed from a tank 45, through valve 46, to a line 47. The butter fat solution is conveyed from a tank 48, through valve 49, to line 47. Line 47 is connected to a two-way valve 50, whereby the mixture of the sugar and butter fat may be conveyed to the tank 42 through line 51, or other tank 43, through line 53.

Tank 42 is provided with an outlet line 54, and tank 43 with an outlet line 55, these outlet lines being connected to a two-way valve 56 to direct the mixture of the condensed milk, sugar and butter fat, to line 57 through a pump 58, to a mix preheating compartment 60 in the preheater 14. The preheated mix is conveyed by line 61, through the compartment 62 of the final heater 17. The final heating of the mix in compartment 62 raises it to the pasteurizing temperature, and the pasteurized mix is conveyed by line 64 to a three-way valve 65 which is operable to direct the mix through one of the selected lines 67, 68, 69, to the holding tanks 70, 71, 72, respectively. These holding tanks are provided with outlet lines 73, 74, 75, extending to a three-way valve 76 which is operable to direct the pasteurized mix through line 77 to a homogenizer 78. The homogenized mix is conveyed through line 79 to a cooler 80 and thence to a storage vat 81.

To commence the day's operations, the evaporator E is started with a small quantity of hot water. As the evaporation of the water commences, the milk feed pump 11 is started to feed the raw milk through the vapor preheater 13 and the compressed steam vapor final heater 16, and the discharge pump 40 is started. The raw milk is preheated by the balance of the vapor or evaporation through line 33, and is finally heated by the excess steam vapor through line 32, and the evaporator is now condensing milk and will continue to do so through the day's run.

The degree of concentration of the raw milk necessary to make the desired mix is determined by lowering or raising the temperature of the tail water or condensate through pump 38 from condenser 35, and this temperature is regulated by regulating the flow of cold water entering the condenser from line 36. This results in a prompt change in the vacuum maintained in the upper portion of the evaporator E and accordingly, the vapor temperature in the evaporator. However, this change of concentration does not change the rate of discharge of the concentrated milk from the evaporator.

During the period that the accumulating vat 42 or 43 is filling, the butter, or other non-fluid fat, or fluid cream, is added to the hot concentrated milk, and also the sugars and stabilizers are added.

For precise control of the mix, the butter fat and sugar is preferably added by weight. The degree of concentration of the milk may be readily determined by sampling with a Beaumé hydrometer. The accumulating mix tanks 42, 43 (are of known capacity, and the amount of sugar, butter fat and stabilizer to produce the desired mix is readily calculable. Accordingly, when the total weight of the material in the accumulating tank is correct for a given capacity in gallons of mix, the valve 56 is actuated to permit the pump 58 to discharge the contents of the vat just filled through the line 51, to the section 60 of preheater 14 and thence continuously through section 62 of the final heater 17, where the mix is elevated to or above the pasteurizing temperature and thence, to the holding tanks 70, 71, 72, by manipulation of the valve 65.

My process readily provides for economical practise of the recent trend of heating to a high temperature at least the ingredients containing milk solids—not-fat, and holding at such high temperature for a length of time which will permit the irreversible coagulation of the albumen content of the milk. The practise of this phase of the art of frozen desserts may be carried on by my process with the lowest possible cost.

The raw milk is conducted from the final heater 16, through the line 12, to a suitable heat exchanger or, as shown in Figure 2, to a steam injector where live steam is used in the amount necessary to raise the temperature of the whole to 220°–270° F. The line 91, extending from the heat exchanger, is of the diameter and length necessary to hold the milk at the high temperature for the desired length of time while it is being conducted to the vacuum chamber 92. The vacuum chamber 92 is a closed vessel in which such vacuum is maintained as will cause the milk to boil at a temperature slightly above the temperature of the compressed vapor produced by the action of the thermo-compressor 25.

As the milk at this ultra high temperature enters the vacuum chamber 92 from pipe 91, flash evaporation of part of the water content of the milk will occur. The vapor so evaporated is drawn through pipe 93 into the steam chest 20 of the evaporator E, thus reducing the quantity of compressed vapor required to be delivered from the thermo-compressor 25, through line 30, to the steam chest 20, below that required to be so delivered to carry on the same rate of evaporation if the ultra high heating practise is not used.

Only a small quantity of milk is present at any one time in the vacuum chamber 92 as it is drawn out continuously through line 94, and the control valve 18, into the evaporator E.

With this feature incorporated in my process, the additional steam required to obtain the high heat treatment will only slightly exceed the quantity of steam required for the operation of the process as previously described. This is because practically all of the heat put into the system through the heat exchanger or injector 90 to obtain the higher temperature is removed by the flash evaporation in the flash chamber 92 and the re-use of the greater part of this flash-off vapor to operate the evaporator in part. This is particularly true where the heat exchanger is of the indirect type and, in which event, less water is consumed by the final condenser 35. Accordingly, by my process this desirable high temperature treatment is effected by a very nominal additional cost over the cost of operating the system described in connection with the arrangement shown in Figure 1.

Furthermore, because of this ultra-high heat treatment of the raw milk, the desired conditioning of the milk solids-not-fat, will have been accomplished when the concentrated milk reaches the accumulating vats 42, 43. It is therefore only necessary to hold the milk at the pasteurizing temperature effected by the heaters 60 and 62 for a short time, the holder tube 64 being sufficient for this. This permits the elimination of the mix holding tanks 70, 71, 72, and conducting the pasteurized mix directly to the homogenizer 78.

It will be apparent that my process functions to make the fullest possible use of the heat available from the vapor of evaporation produced in the evaporator E, particularly for the pasteurization of the mix. Also, the ultra high heat treatment can be incorporated with little or no increase in the overall cost of operating the system.

My process only requires the services of a single operator for simultaneously producing the concentrated milk and the completed and pasteurized mix. This results in a substantial reduction in the labor cost of the prepared mix. Also, my process results not only in the economy of steam consumption but particularly in the reduction of water consumption to the condenser 35 inasmuch as the major portion of the heat is removed from the vapor of evaporation by the preheater 14, and the major portion of the heat is removed from the compressed vapor by the final heater 17 accordingly requiring less consumption of water to the final condenser 35. This water saving is of considerable magnitude, in the order of several thousand gallons per day, and by my process the saving is at least fifty percent of the water necessarily consumed in the separate plant for making the condensed milk.

What I claim is:

1. The method of making a frozen dessert mix, the steps consisting in conducting raw milk from a supply to a steam operated, recompression evaporator and evaporating the milk therein at a temperature of substantially 140° F., at subatmospheric pressure, compressing a portion of the vapor of evaporation from the evaporator by the steam supply to the evaporator to furnish steam vapor thereto in excess of that necessary for the operation of the evaporator, conducting the remainder of the vapor of evaporation from said evaporator to a pair of pre-heat exchangers, conducting the excess compressed steam vapor from the evaporator to a pair of high temperature heat exchangers, conducting the raw milk from said supply successively through one of said pre-heat exchangers and one of said high temperature heat exchangers to raise the raw milk temperature entering the evaporator to substantially 175° F., removing the evaporated milk from the evaporator, adding sugar and butter fat to the evaporated milk to form the mix, passing the mix successively through the second of said pre-heat exchangers and the second of said high temperature heat exchangers to heat said mix to pasteurizing temperature of substantially 175° F., homogenizing the pasteurized mix, and then cooling the same.

2. The method of making a frozen dessert mix, the steps consisting in conducting raw milk from a supply to a steam operated recompression evaporator having a steam chest and a vapor separator, evaporating the milk therein at a temperature of substantially 140° F., at subatmospheric pressure, compressing a portion of the vapor of evaporation from the vapor separator by the steam supply to the evaporator to furnish steam vapor to the steam chest thereof in excess of that necessary for the operation of the evaporator, conducting the remainder of the vapor of evaporation from said vapor separator to a pair of pre-heat exchangers, conducting the excess compressed steam vapor from the steam chest to a pair of high temperature heat exchangers, conducting the raw milk from said supply successively through one of said pre-heat exchangers and one of said high temperature heat exchangers to raise the raw milk to a temperature of substantially 175° F., further heating the raw milk to a temperature of 220° to 270° F., conducting the heated milk to a vacuum chamber in which a sub-atmospheric pressure is maintained, causing the milk to evaporate at a temperature approximately equal to the temperature of the compressed steam vapor used to operate the recompressed evaporator, conducting the vapor of evaporation from said vacuum chamber to the steam chest of the evaporator and further conducting the milk from the vacuum chamber to the recompression evaporator, removing the evaporated milk from the evaporator, adding sugar and butter fat to the evaporated milk to form the mix, passing the mix successively through the second of said pre-heat exchangers and the second of said high temperature heat exchangers to heat said mix to pasteurizing temperature of substantially 175° F., homogenizing the pasteurized mix and then cooling the same.

References Cited in the file of this patent

FOREIGN PATENTS 20,219 Great Britain _____ July 18, 1896
of 1895